United States Patent [19]
Clemente

[11] Patent Number: 5,905,323
[45] Date of Patent: May 18, 1999

[54] BRUSH HOLDER ASSEMBLY HAVING DYNAMIC LOADING

[76] Inventor: Roger Clemente, 11 Dorchester Way, Shrewsbury, N.J. 07701

[21] Appl. No.: 09/010,251

[22] Filed: Jan. 21, 1998

[51] Int. Cl.⁶ ............................. H01R 39/38; H01R 39/40
[52] U.S. Cl. ............................................. 310/239; 310/245
[58] Field of Search .................................... 310/239, 245, 310/246, 247, 248

[56] References Cited

U.S. PATENT DOCUMENTS

| | | | |
|---|---|---|---|
| 3,025,421 | 3/1962 | Sievert | 310/245 |
| 4,371,803 | 2/1983 | Schindel et al. | 310/242 |
| 4,785,214 | 11/1988 | Mummert | 310/241 |

*Primary Examiner*—Thomas M. Dougherty
*Assistant Examiner*—Dang Dinh Le
*Attorney, Agent, or Firm*—Louis E. Marn

[57] ABSTRACT

An improved method for the manufacture of a compact brush guide holder assembly which is commonly found on machines in which electricity is to be transferred between an electrically conductive brush element as it moves and makes contact with a rotatable conductor such as a commutator. The brush holder assembly has an open body guiding channel, or chamber, for supporting the electrically conductive brush element which receives compressed tension from a fixed non-removable constant force spring which is composed of a beam uncoiled section in addition to a coiled section having fixed mounted Teflon bushings that are free to ride and float horizontally and vertically on mounting post that pass through its center. Upon compression, the contour structural integrity and memory characteristics of the constant force spring are maintained as it self adjusts to the dynamic loads and tension requirements of a rush as it biases a commutator.

21 Claims, 3 Drawing Sheets

BRUSH HOLDER ASSEMBLY HAVING DYNAMIC LOADING

BACKGROUND OF INVENTION

1. Field of Invention

This invention relates to electric machines, and more particularly to a brush holder assembly for an electric motor.

2. Brief Description of Prior Art

Brush holder assemblies which control the movement of the brush against the commutator have a critical effect on overall motor performance. There are numerous designs which are currently used by motor manufactures including assemblies which use constant force springs to control brush movement against the armature. Some assemblies limit brush loading to the front while others can be loaded from the back. On the latter, the constant force spring must be removed to install a new brush. Both designs limit brush movement, restrict brush cooling, require complicated brush holder designs, and necessitate substantial space for installation. Previous assemblies restrict how the constant-force spring is held in place because the spring manufacturers recommendations limit the approved method to return the constant-force spring to the outside portion of the coiled sections. There is the need for an improved brush holder assembly to hold the inside coil sections of the constant force spring which do not interfere with brush loading.

OBJECTS OF THE INVENTION

An object of the present invention provides for a method of a brush holder manufacturing which improves brush performance characteristics, reduces manufacturing costs, and provides for more useable space inside the motor.

Another object of the present invention to provide a simplified brush holder assembly for an electric motor which has a fixed, non-removable, floating, constant-force spring having extended travel length which allows the brush to be installed through the front or the back of the brush guideway assembly during initial motor assembly or removed and replaced externally from the back of the brush guideway without motor disassembly.

Yet another object of the present invention is to provide an improved multiple method of brush latching and unlatching during motor assembly.

Another object of the present invention allows a brush to be guided, supported and held in place by a fixed, non-removable, floating, inter-locking constant-force spring resulting in the formation of the major integral structural component of the brush holder assembly.

A further object of the present invention is to provide an open body brush guide assembly having a fixed, non-removable, constant-force spring which supplies compressed tension that allows a brush to float inside the brush holder by self-adjusting to the critical dynamic loads, including centrifugal, axial, radial, thrust and recoil as it travels toward the commutator.

Still another object of the present invention provides for an improved brush holder assembly that increases the dynamic movement of both the brush and constant-force spring.

Yet another object of the invention provides for a brush, housed in brush holder assembly, that reduces arcing and improved brush commutation.

It is another object of the present invention to provide a brush holder assembly which improves the travel movement of a brush against the commutator which results in not only improving life expectancy of both said components but also substantially reducing motor noise.

Still yet another object of the present invention is to provide a brush holder assembly permitting a better ventilated brush which decreases component temperature thereby increasing current carrying capabilities.

Still another object of the present invention is to provide a compact streamlined brush holder assembly which not only requires less area for installation but also allows utilization of a longer oversized brush.

It is another object of the present invention to reduce the surface area contact between the brush and the holder, thereby improving brush cooling while reducing friction between components.

Another object of the present invention is to provide for a brush holder assembly that does not restrict the use of a brush having multiple leads.

Another object of the present invention provides a novel way for the inside coils of a constant-force spring having Teflon tube bushing inserts to be held without restricting performance.

Yet another object of the present invention allows the brush to have greater overall travel capabilities.

Still yet another object of the present invention allows the constant-force spring to be permanently held in place thereby eliminating the need to remove the spring when changing the brush.

Yet another object of the present invention is to provide better memory control of a constant-force spring when it is compressed and uncoils against the brush.

SUMMARY OF THE INVENTION

These and other objects of the present invention are achieved by a brush holder assembly for an electric motor or generator wherein a floating, non-removable, extra-long, constant-force spring is held in place by post supporting Teflon bushings inserts installed inside coils of the constant-force spring which upon compression structurally supports, guides, and holds a brush, provides a multiple means of brush installation, removal, latching, and unlatching and allows the dynamic movement and control of a brush as it moves towards a commutator.

BRIEF DESCRIPTION OF THE DRAWINGS

These and other objects of the present invention will be more readily understood by reference to the following detailed description when taken with the accompanying drawings wherein like numerals designate like parts throughout, and wherein.

Figure 1:
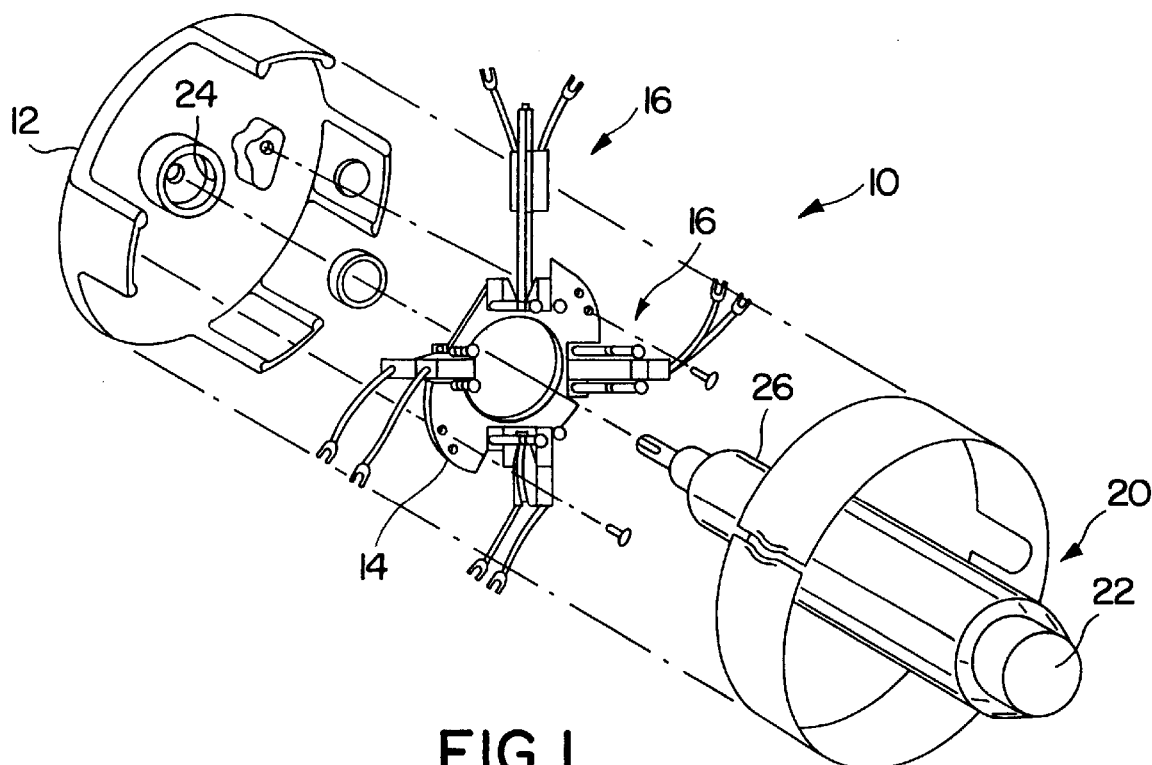
FIG. 1 is a partial fragmentary, isometric view of a portion of a dynamoelectric machine illustrating the brush and brush holder assembly of the present invention.
Figure 2:
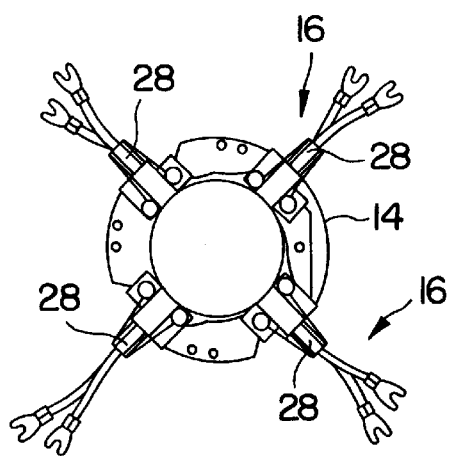
FIG. 2 is an elevational view of the yoke of the dynamoelectric machine of FIG. 1.

Referring now to the drawings, and particularly FIGS. 1 and 2, there is illustrated a dynamoelectric machine, generally indicated as 10. The dynamoelectric machine 10 may be a conventional DC motor having a tubular frame (not shown) and a cover or end frame 12, attached to an open end of the tubular frame, such as by bolts (not shown) in a conventional manner. An insulated support or yoke member 14 is provided with a plurality of brush and brush holder assemblies, generally indicated as 16, disposed equidistantly and radially on the yoke 14. The yoke 14 is fastened to the end frame 12 of the machine 10 in a manner known to one skilled in the art. The yoke 14 is preferably fabricated from a thermoplastic dielectric material and is formed with orifices to provide for the mounting of each brush holder assembly 16 as well as to provide mounting of the yoke 14 to the end frame member 12 of the machine 10.

Interiorly of the tubular frame of the machine 10, there is provided an armature or rotor, generally indicated as 20, rotatably positioned within a field structure (not shown). Such field structure is conventional and may include permanent magnetic field or include windings connected to terminal posts leading to the exterior of the housing in a manner known to one skilled in the art. The armature 20 is provided with a shaft 22 journaled for rotation within a recessed portion or cavity 24 formed in the end frame 12. A thrust washer (not shown) may be provided between a bearing and the rotor 20. The shaft 22 of the armature 20 is provided with a commutator 26 formed with a peripheral surface which cooperates with equidistantly radially-extended brushes 28 slidably mounted in a respective brush holder assembly 16, as more fully hereinafter discussed.

Figure 3:
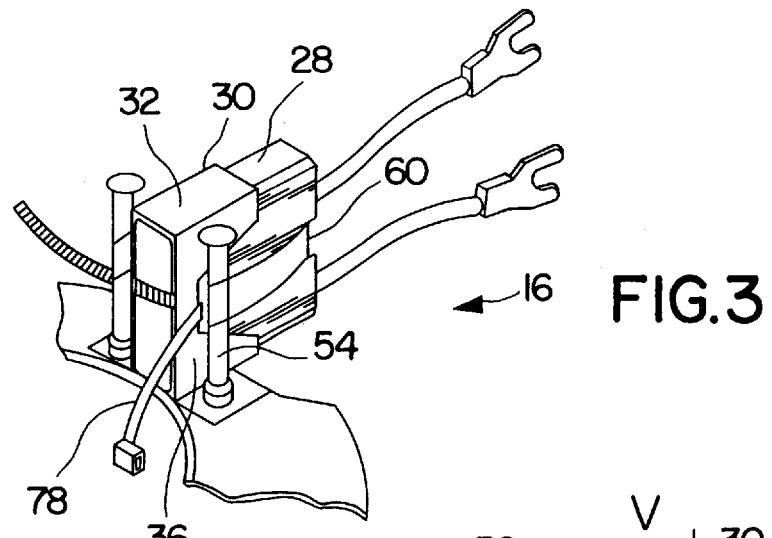
FIG. 3 is an isometric view of the brush and brush holder assembly of the present invention.
Figure 4:
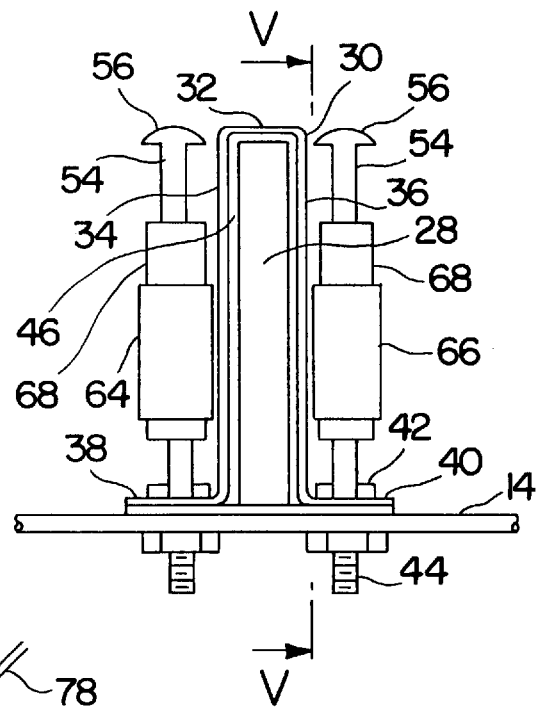
FIG. 4 is a front view of the brush and brush holder assembly of the present invention.
Figure 5:
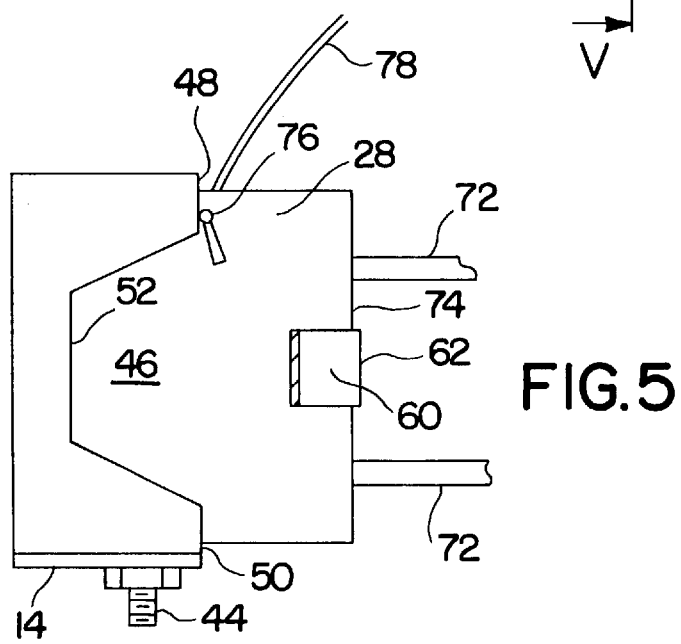
FIG. 5 is a cross-sectional view of FIG. 4 taken along the lines V—V of FIG. 4.

The brush holder assembly 16 of the present invention, referring now to FIGS. 3 to 5, is comprised of a generally U-shaped, elongated housing member 30 including an upper end wall portion 32, parallelly-disposed side wall portions 34 and 36 and outwardly extending leg portions 38 and 40 perpendicularly disposed to the side wall portions 34 and 36, respectively. The elongated housing member 30 is radially mounted, such as by nuts 42 and bolts 44 to the yoke 14 defining a chamber 46. Each side wall portion 34 and 36 is formed with an intermediate open area 46, referring to FIG. 5, defined by upper and lower rear edge segments 48 and 50 extending inwardly towards a front of each side wall portion 34 and 36 terminating at an inner edge segment 52.

An elongated pin member 54 having an upper top head 56 is mounted on both sides of the housing 30 parallelly-disposed to the housing member 30. Each pin member 54 is mounted within orifices (not shown) in the leg portions 38 and 40 of each side wall member.

A twin coil spring member 60 of constant tension force having a main body position 62 and end coil portions 64 and 66 with each coil portion mounted on a plastic cylindrically-shaped bushing member 68. Each plastic bushing member 68 is formed with a centrally-disposed channel for rotatable mounting on each pin member 54, as illustrated in FIGS. 3 and 4. The plastic bushing member 68 is formed of a dielectric plastic material exhibiting reduced interfrictional forces, such as polyfluroethylene, e.g. Teflon, a registered trademark of Dupont de Nemours and Co. The elongated and square-shaped armature brush member 28 including conductors 72 is positioned within the chamber 46 defined by the housing member 30 and the yoke 14 wherein the main body portion 62 of the twin coil spring member 60 is biased against an end portion 74 of the brush member 28, as illustrated in FIG. 5, and as more fully hereinafter described.

In assembly, the elongated and square-shaped brush member 28 is introduced into the chamber 46 through the front opening of the housing member 30 and inserted against the main body portion 62 of the coil spring member 60 to a point where the brush member 28 is fully inserted within the housing chamber 46 and an orifice 76 formed in the brush member 28 is accessible for inserting of a plastic string member 78 to hold the brush member 28 in a preloading position. After mounting the brush and brush holder assemblies on the yolk 14 and positioning of the yolk 14 in the motor assembly 10 with the armature 20 suitably positioned therein, each plastic string member 78 is withdrawn to release the brush member 28 thereby to cause the brush member 28 to contact the commutator 26 of the armature 20 under the biased spring force of the twin coil spring member 60.

Alternately, the brush member 28 may be positioned within the chamber 46 of the housing member 30 by causing the main body 62 of the twin coil spring member 60 to be pulled backwards to a point permitting positioning of the brush member 28 at an opening in the rear portion of the housing member 30 with subsequent pre-loading positioning of the brush member 28 effected by the string member 78 as herein above discussed.

Figure 6:
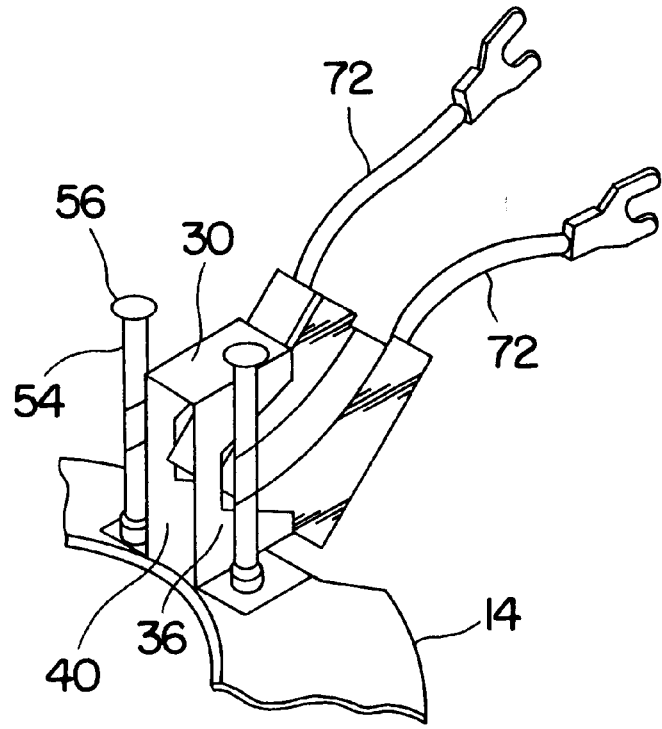
FIG. 6 is an isometric view of a brush and brush holder of the present invention in another loading configuration.

Referring now to FIG. 6, there is illustrated another pre-loading configuration of the brush and brush holder assembly 16 of the present invention wherein the twin coil spring member 60 is of a sufficient length to permit the brush member 28 to be withdrawn from the chamber 46 to a point where the front surface of the brush member 28 may be positioned at an angle against the yoke member 14. Upon positioning of the yoke member including brush and brush holder assemblies 14 within the machine 10, the brush member 28 is pulled back and realigned in paralleled relationship to the chamber 46 of the housing 30 to permit the brush member 28 to be biased against the commutator 26, as herein above discussed with reference to FIGS. 3 to 5.

Figure 7:
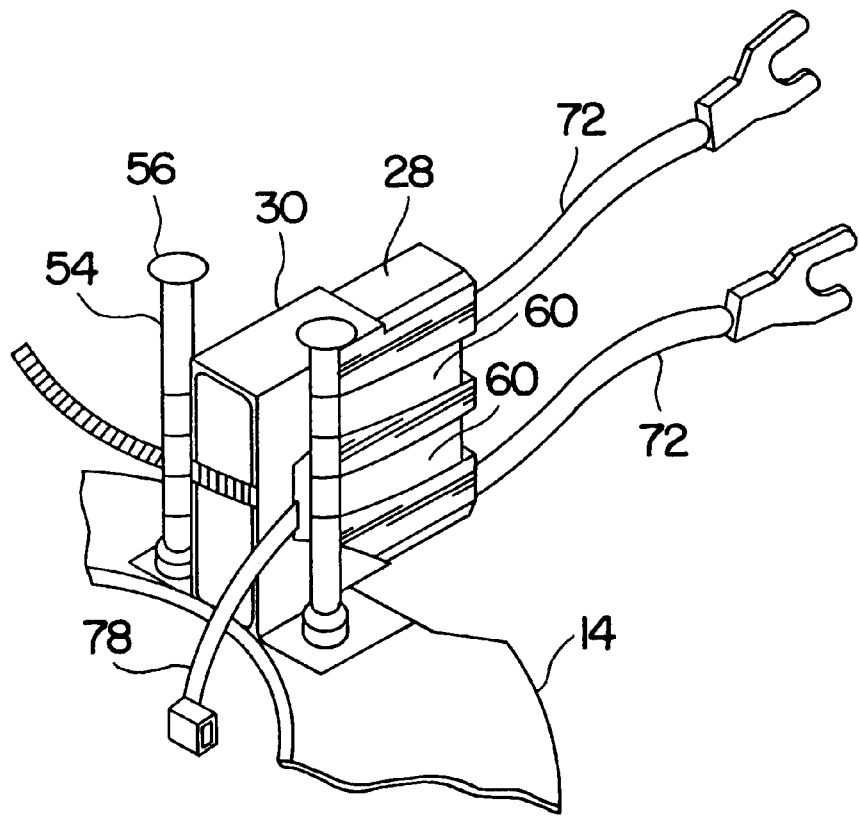
FIG. 7 is an isometric view of another embodiment of the present invention.

Referring now to FIG. 7, there is illustrated an oversized brush member 28 positioned within the chamber 46 of the brush holder housing 30 wherein two twin coil spring members 60 are mounted on the pin members 54 with each end coil 64 and 66 mounted about cylindrically-shaped plastic bushing members, as herein above discussed with reference to FIGS. 3 to 5.

While the invention herein has been described in connection with exemplary embodiments thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed:

1. A brush holder assembly for use in a machine in which electricity is to be transferred between a rotatable conductor and an electrically-conducting brush element making contact with said rotatable conductor, and wherein said brush holder assembly is rigidly mounted on a yoke of said machine, which comprises:

a housing member connected to said yoke and formed with an aperture to receive said electrically-conducting brush element;

spring member including a body portion and end coil portions extending about said housing member wherein said body portion biases said electrically-conducting brush element against said rotatable conductor;

an elongated pin member mounted on each side of said housing member; and a plastic cylindrically-shaped bushing member mounted in each end coil portions of said spring member, said plastic bushing member formed of a plastic dielectric material and rotatable mounted on said elongated pin member for self-adjustment of said brush element to dynamic loads.

2. The brush holder assembly as defined in claim 1 wherein said housing member is U-shaped and formed with a pair of legs for mounting said housing member to said yoke.

3. The brush holder assembly as defined in claim 2 wherein each of said legs of said U-shaped housing member is formed with an outwardly-disposed feet portion for connecting said U-shaped housing member to said yoke.

4. The brush holder assembly as defined in claim 1 wherein said elongated pin members are provided with upper head portions to restrict movement of said cylindrically-shaped plastic bushing members rotatable mounted thereon.

5. The brush holder assembly as defined in claim 1 wherein said spring member means is a constant force tension spring.

6. The brush holder assembly as defined in claim 5 wherein there are a plurality of spring members means.

7. The brush holder assembly as defined in claim 1 wherein said plastic bushing member is formed of polyfluoroethylene thermoplastic material.

8. The brush holder assembly as defined in claim 1 wherein said spring member is dimensioned to permit withdrawal of said brush member rearwardly of said housing member.

9. The brush holder assembly as defined in claim 1 wherein said brush member is formed with an orifice to receive a plastic string member to hold said brush member in a pre-loading configuration.

10. A brush holder assembly as defined in claim 1 wherein said spring member having a predetermined memory travel is not effected by changes in motor speed or direction.

11. A brush holder assembly as defined in claim 1 wherein said spring member pivots and swivels in both horizontal and vertical movement.

12. A brush holder assembly as defined in claim 1 wherein dynamic movement of said brush against said commutator controls noise, arcing and electromagnetic interference.

13. A brush holder assembly as defined in claim 1 wherein dynamic movement of said brush and geometric spring memory characteristics are uniform on multiple brush applications.

14. A brush holder assembly for use in an electric machine which comprises:

a housing member defining an aperture for an electrically-conducting brush element;

spring member including a body portion and end coil portions extending about said housing member, said body portion biasing said electrically-conducting brush element against said rotatable conductor;

an elongated pin member mounted on each side of said housing member; and side spring end coil portions having integrally-mounted cylindrically-shaped plastic bushing insert formed of a plastic dielectric material having polyfloroethylene properties which are combined to rotatably mount and float on said elongated pin member allowing self-adjustment of said brush element to dynamic loads and memory characteristics of said spring member.

15. The brush holder assembly as defined in claim 14 wherein said housing member is U-shaped and formed with a pair of legs for mounting said housing member to said yoke.

16. The brush holder assembly as defined in claim 14 wherein said elongated pin members are provided with upper head portions to restrict rotational movement of said cylindrically-shaped plastic bushing inserts to said elongated pin members.

17. The brush holder assembly as defined in claim 14 wherein said spring member is a constant force tension spring.

18. The brush holder assembly as defined in claim 14 wherein there are a plurality of spring members means.

19. The brush holder assembly as defined in claim 14 wherein said plastic bushing member is formed of a polyfluoroethylene thermoplastic material.

20. The brush holder assembly as defined in claim 14 wherein said spring member is dimensioned to permit withdrawal of said brush member rearwardly of said housing member.

21. The brush holder assembly as defined in claim 14 wherein said brush member is formed with an orifice to receive a plastic string member to hold said brush member in a pre-loading configuration.

\* \* \* \* \*